(12) United States Patent
Di Stefano

(10) Patent No.: US 8,617,716 B2
(45) Date of Patent: *Dec. 31, 2013

(54) FILM-COATED GLAZING HAVING A PROTECTIVE LAYER OF MIXED TITANIUM OXIDE

(75) Inventor: Gaetan Di Stefano, Jumet (BE)

(73) Assignee: AGC Glass Europe, Bruxelles (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/933,511

(22) PCT Filed: Mar. 20, 2009

(86) PCT No.: PCT/EP2009/053291
§ 371 (c)(1),
(2), (4) Date: Sep. 20, 2010

(87) PCT Pub. No.: WO2009/115596
PCT Pub. Date: Sep. 24, 2009

(65) Prior Publication Data
US 2011/0008641 A1    Jan. 13, 2011

(30) Foreign Application Priority Data
Mar. 20, 2008  (EP) .................................. 08102817

(51) Int. Cl.
*C03C 17/36*  (2006.01)
(52) U.S. Cl.
CPC .......... *C03C 17/3605* (2013.01); *C03C 17/361* (2013.01); *C03C 17/3613* (2013.01); *C03C 17/3615* (2013.01); *C03C 17/3644* (2013.01)
USPC .......... 428/426; 428/432; 428/434; 428/469; 428/697; 204/192.16

(58) Field of Classification Search
USPC ......... 428/428, 426, 432, 688, 689, 697, 699, 428/701, 702
See application file for complete search history.

(56) References Cited

U.S. PATENT DOCUMENTS

| | | | |
|---|---|---|---|
| 5,514,485 A | 5/1996 | Ando et al. | |
| 6,306,525 B1 * | 10/2001 | Schicht et al. | ................ 428/633 |
| 2003/0143401 A1 | 7/2003 | Hukari et al. | |

(Continued)

FOREIGN PATENT DOCUMENTS

| | | |
|---|---|---|
| EP | 0 922 681 | 6/1999 |
| WO | 02 42234 | 5/2002 |
| WO | 2004 013059 | 2/2004 |

OTHER PUBLICATIONS

U.S. Appl. No. 12/933,542, filed Sep. 20, 2010, Di Stefano.

(Continued)

*Primary Examiner* — David Sample
(74) *Attorney, Agent, or Firm* — Oblon, Spivak, McClelland, Maier & Neustadt, L.L.P.

(57) ABSTRACT

The present invention relates to essentially transparent glazings comprising a system of films deposited under vacuum by magnetron, and having antisun and/or low-emission properties, comprising as protective surface layer a layer based on titanium oxide and on at least one other metal oxide of high hardness from the group comprising: $ZrO_2$, $SiO_2$, $Cr_2O_3$. The glazings according to the invention are of a nature to withstand a heat treatment at 550° C. for 5 minutes without giving rise to the presence of optical effects, especially of coloration or iridescence. These glazings are termed toughenable.

22 Claims, 2 Drawing Sheets

(56) References Cited

U.S. PATENT DOCUMENTS

| | | |
|---|---|---|
| 2004/0053068 A1 | 3/2004 | Schicht et al. |
| 2004/0241490 A1 | 12/2004 | Finley |
| 2005/0260419 A1 | 11/2005 | Hukari et al. |
| 2006/0099427 A1 | 5/2006 | Schicht et al. |
| 2006/0134436 A1 | 6/2006 | Maschwitz |
| 2007/0218311 A1* | 9/2007 | O'Shaughnessy et al. ... 428/621 |
| 2007/0231501 A1 | 10/2007 | Finley |

OTHER PUBLICATIONS

U.S. Appl. No. 12/933,602, filed Sep. 20, 2010, Di Stefano.

* cited by examiner

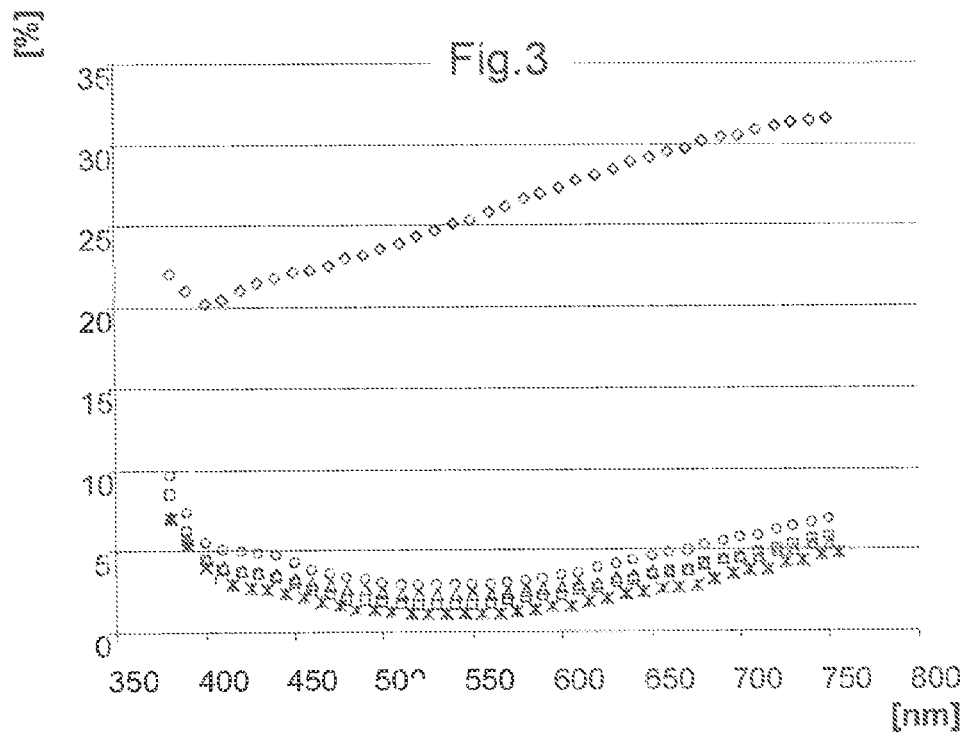
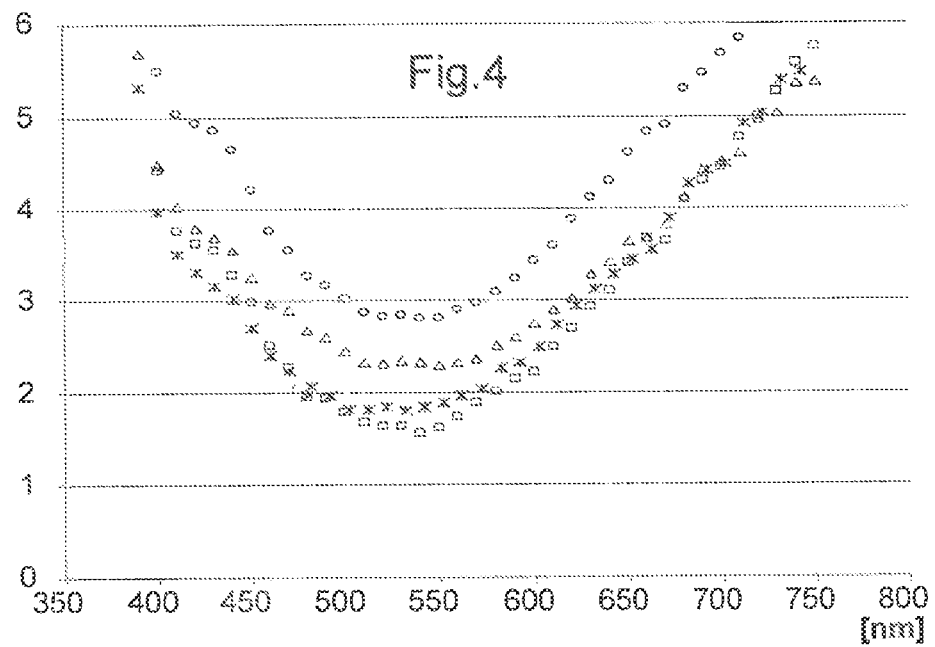

FILM-COATED GLAZING HAVING A PROTECTIVE LAYER OF MIXED TITANIUM OXIDE

The present invention relates to glazings comprising a set of films that impart antisun or low-emission properties, and that are capable of withstanding heat treatments of bending/toughening type.

The commonest coatings for the glazings in question are made via magnetron-assisted vacuum deposition techniques, known as "magnetron sputtering".

Layer systems deposited by these means make it possible to achieve noteworthy performance, both in terms of the thermal characteristics and in terms of the optical aspects. They may especially have very high selectivity, in other words they may constitute powerful filters for infrared rays, while at the same time allowing visible wavelengths to pass through. Under the best conditions, they may offer perfect reflection neutrality, especially avoiding undesired colourations.

Beyond the desired qualities, the glazings in question must also show sufficient resistance to the various attacking factors to which they may be exposed. These are especially chemical attacking factors: air, water, saline fogs, etc., but also mechanical attacking factors to which they are subjected in the course of transportation or transformation during their use.

Glazings are moreover subjected to transformations such as toughening or bending, which involve heat treatments at temperatures of between 550 and 700° C. The layer systems of these glazings must be sparingly sensitive or insensitive to these treatments: in other words, their characteristics must remain substantially unchanged. Above all, the glazings must remain free of defects that would modify either the optical characteristics, especially the transparency, or their appearance via the formation, for example, of marks or iridescence.

Glazings having these antisun and/or low-emission properties invariably comprise a set of "functional" layers that reflect infrared, and of dielectric layers that protect the first layers and minimize the reflection of the visible wavelengths.

Among the protective layers, the outermost must especially give these systems the chemical resistance and mechanical strength properties mentioned earlier, whilst, obviously, not impairing the other properties. As a guide, layers that are nevertheless renowned for their mechanical strength, especially certain carbides such as those of titanium or zirconium, are too absorbent to be able to be used, even at very low thicknesses.

Various previous proposals have at least partially addressed the requirements associated with these surface layers, also known as top coats. Among the layers the most commonly used are especially titanium oxide layers, tin oxide layers, silica layers, and nitride or oxynitride layers, especially those of silicon and/or aluminium. From experience, titanium oxide or tin oxide layers are too sensitive to the heat treatment. Titanium nitrides and zirconium oxynitrides especially show good resistance to the heat treatments, in the sense that they offer the required characteristics after treatment. However, these layers show substantial variations in light transmission before and after treatment, which are such that untreated glazings cannot be placed next to others that are not.

Surface layers, which make it possible to combine glazings before and after heat treatment, have been proposed. These are especially silica and silicon nitrides. The deposition of silica is very difficult, and silicon nitride layers show insufficient resistance to scratching.

The invention proposes surface layers for these antisun and/or low-emission systems, which offer an improved set of properties when compared with those of prior art systems.

The invention proposes to provide as a surface layer a layer based on titanium oxide and on at least one other metal oxide of high hardness, from the group comprising: $ZrO_2$, $SiO_2$, $Cr_2O_3$.

The respective proportions of titanium oxide and of the other metals may cover a wide range. In order for the effect to be noticeable, the additional oxide(s) must represent at least 5% by weight and preferably at least 10% by weight of the whole.

In the mixed oxide, the titanium oxide is present to a proportion of at least 40% by weight and preferably at least 50% by weight.

In a particularly preferred manner, titanium oxide represents at least 55% by weight.

In the mixed oxides used according to the invention, in addition to titanium oxide, zirconium oxide is particularly preferred on account of its very high hardness. It is advantageously present in a proportion of 15% to 50% by weight of the surface layer.

Besides the oxides of titanium and of the metals listed above, the surface layer according to the invention may also contain additional oxides that are practically indissociable from the preceding oxides. This is particularly the case for lanthanides, for instance yttrium oxide or hafnium oxide. When these additional oxides are present, their content remains relatively limited and does not exceed 8% by weight of the whole, and usually remains below 5%.

To play its protective role satisfactorily, the surface layer must have a certain thickness. However, if this layer is provided only for the mechanical properties it gives the layer system, a relatively modest thickness may suffice. Preferably, the thickness of this layer is not less than 3 nm.

Given that the oxides included in the composition of this surface layer are transparent, it is possible to use much thicker layers than would be necessary to improve the resistance. It is especially possible to use this protective layer as a component of the interference filter, in other words as a layer that significantly participates in maintaining high visible transmission and in establishing good reflection neutrality.

The surface layer used as a component of the interference filter is advantageously combined with other dielectric layers. The choice of the assembly then takes into account not only the optical or structural properties of the various layers (index, transparency, crystal structure, interface quality), but also the relative ease of formation of these layers.

Whatever the structure considered, in practice the surface layer according to the invention remains at a thickness of not more than 35 nm.

Where appropriate, the layer systems according to the invention may also comprise several protective surface layers. The layer based on titanium oxide may be combined with other layers whose purpose is also to improve the resistance to the heat treatment. Layers of this type located under the layer based on titanium oxide are especially layers of metallic titanium, which become oxidized during this heat treatment. They may also be layers of titanium nitride, of titanium oxynitride, or a layer of titanium niobium oxide, of Zr or of Zr nitride, of TiZr or of TiZr nitride.

The surface layers according to the invention that especially impart very good mechanical properties are also advantageously combined with layers that offer great resistance to chemical agents. Layers of this type are especially layers of silicon nitride and silicon oxynitride (optionally with aluminium present in the cathodes as dopant). These layers are immediately under the protective surface layer(s) and especially that based on titanium oxide. These additional layers have a thickness that may also be relatively modest, of the order of a few nanometres.

The surface layers according to the invention are sparingly sensitive or insensitive to bending or toughening heat treatments. When subjected to a temperature of at least 550° C. for 5 minutes and for a thickness of 20 nm, their light transmission does not vary by more than 0.1%. As a guide, an analogous glazing coated with a mechanically strong layer of TiN develops a substantial haze under the same conditions.

The coated glazings according to the invention advantageously have a scratch resistance according to the method forming the subject of standard ASTM 2486D, which is not greater than 30% and preferably not greater than 20% on a scale ranging from 0 to 100%, 100% corresponding to an entirely scratched glazing.

The coated glazings according to the invention also offer very good resistance in humidity tests. When subjected to the "Cleveland" test according to standard ISO 6270, for 3 days, the level reached is advantageously at least 3 on a scale ranging from 1 to 5, 5 corresponding to perfectly defect-free glazing. For the samples subjected to the saline spray test according to standard EN 1096, the result is advantageously greater than 3 after 2 days of exposure.

Systems comprising the "top coats" according to the invention especially correspond to the following structures:

glass/blocking layer/nucleation layer/Ag/barrier/dielectric/top coat.

glass/blocking layer/nucleation layer/Ag/barrier/dielectric/nucleation layer/Ag/barrier/dielectric/top coat.

glass/blocking layer/nucleation layer/Ag/barrier/dielectric/nucleation layer/Ag/barrier/dielectric nucleation layer/Ag/barrier/dielectric/top coat.

The invention is described in detail in the following examples, which are also the subject of the attached figures in which:

FIG. 3 is a graph representing the light absorption as a function of the wavelength for oxide monolayers used according to the invention;

FIG. 4 is analogous to the preceding figure, at a more detailed scale.

Figure 1:
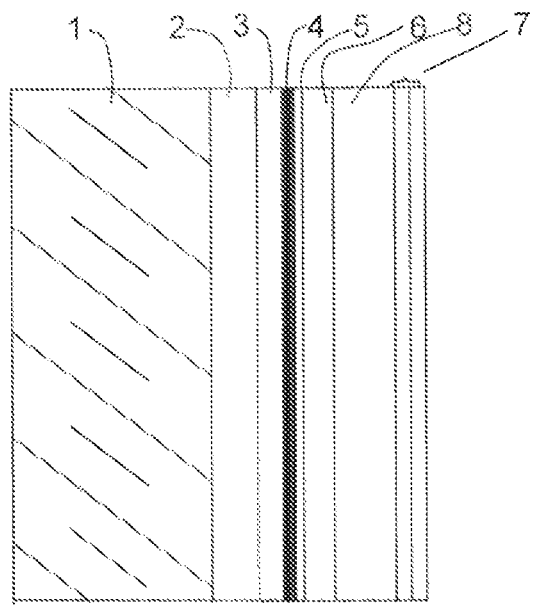
FIG. 1 is a schematic representation of a cross section of a glazing coated with a comparative layer system.

The glazing of FIG. 1 is shown in cross section without respecting the proportions of the various components, for the sake of clarity. The pane of glass 1 is coated with a set of layers comprising an infrared-reflecting silver-based layer 4. This silver layer is arranged between two sets of dielectric layers that protect it and give it good light transmission with good reflection neutrality.

The silver layer 4 is advantageously deposited on a layer 3 based on zinc oxide. Zinc oxide layers and layers based on doped zinc oxide are known for promoting the formation of a good interface with silver layers, especially without any roughness. They improve as a whole the properties of the latter layers. For the same amount of silver per unit area, the conduction, and hence the emissivity of the layers, are improved when they are deposited in this way. It may be a case of a low thickness of zinc oxide alone, the thickness of which is not greater than 15 nm.

When the thickness of zinc oxide is larger, there is a risk of developing columnar growth, which leads to a less uniform interface with increased roughness. To avoid this type of growth, it is known practice to dope the zinc oxide with other oxides, especially tin, aluminium or gallium oxide.

The layers formed from zinc tin mixed oxide are conventionally of two types. The layers on which the silver layers are deposited advantageously have a low content of tin oxide, especially of about 10% by weight. As indicated previously, these layers are relatively thin and do not exceed 15 nm. The second type of zinc and tin mixed oxide layer is used to constitute in dielectric assemblies the main part of the optical path for dereflective effects. In this function, the layer(s) in question ordinarily have thicknesses of several tens of nanometres. Typically, layers of this type are formed from a mixed oxide containing about 50% by weight of each of the zinc and tin oxides. These layers have the advantage of great stability, in particular during the heat treatments to which the glazings may be subjected.

In the example shown in FIG. 1, a protective layer 5 is deposited on the silver layer 4. This is a conventional layer whose purpose is to protect the silver layer against impairments that might affect it during the subsequent depositions, especially when these depositions are performed in a reactive mode, for example under an oxidative atmosphere. The layer 5 is referred to as a "barrier" or "sacrificial" layer when it intervenes by reacting with the atmosphere, which, in the absence of this layer, would be liable to react with the silver layer.

These sacrificial layers are of very low thicknesses. They are not more than 6 nm and their thickness is preferably 2 or 3 nm. They are conventionally based on oxides, especially of titanium or of a mixed oxide of NiCr, of zirconium oxide, titanium oxide offering the advantage of great transparency. Since they are deposited to be able to react while protecting the silver, they are often formed from the corresponding metals, and oxidized in the following constitution of the stack. For this reason, these layers are often sub-stoichiometric. It is also possible to deposit them using ceramic targets that are themselves sub-stoichiometric. This way of proceeding makes it possible more conveniently to achieve in the final layer good oxidation in the region of the stoichiometry. In this manner, the extinction coefficient of the layer is optimally reduced.

In FIG. 1, layers 2, 6 and 8 are layers included in the constitution of the filter. They make it possible to prevent reflection of the majority of the rays in the visible region. By virtue of these layers, the colour of the transmitted light and above all of the reflected light is also controlled, it being known that, in the vast majority of applications, every effort is made for the latter to ensure that this light is as weak and as neutral as possible.

The conventional dielectric layers are mainly formed from oxides of: Zn, Sn, Ti, Al, Zr, Nb. Their thickness depends on their index and on the required optical paths, which are themselves dependent on the thickness of the infrared-reflecting layer. The relationships between these magnitudes are perfectly established and usually give rise to determinations by means of specialized programs. Starting from the values thus determined, the subsequent adjustments are made to take into account the differences that may exist between the effective structure, composition or configuration characteristics and the corresponding characteristics of the ideal layers.

The surface layer 7 is a surface layer protecting against mechanical attack.

Figure 2:
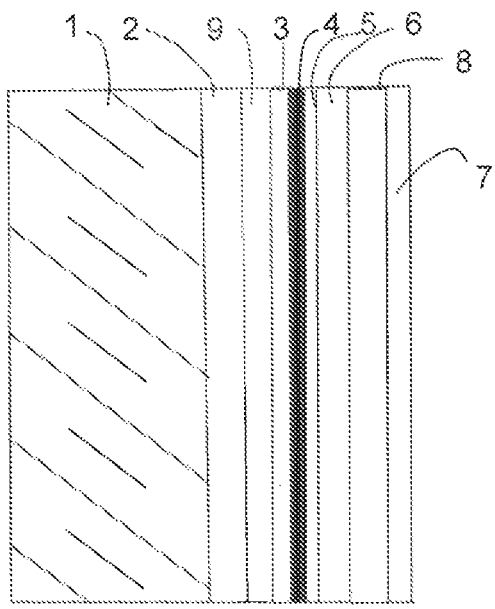
FIG. 2 represents an analogous layer system, according to the invention.

According to the invention (FIG. 2), layer 7 is based on titanium oxide comprising an oxide of high hardness ($ZrO_2$, $SiO_2$, $Cr_2O_3$).

The comparative example is shown in FIG. 1. In this example, the surface layer is formed by titanium nitride, or alternatively by a layer of titanium nitride coated with a layer of graphite.

A series of tests is performed on toughenable products, in other words products whose optical and opto-energetic properties (light transmission, emissivity, coloration, etc.) withstand heat treatments at high temperatures.

The qualities of products according to the invention are compared with those of analogous products whose surface layers do not satisfy the conditions of the invention.

The following structures are prepared:

|  | $ZSO_5$ | $ZSO_9$ | Ag | TiOx | $ZSO_9$ | $ZSO_5$ | TiN | C |
|---|---|---|---|---|---|---|---|---|
| Comp. Ex. 1 | 250 | 100 | 95 | 50 | 100 | 250 | 35 | |
| Comp. Ex. 2 | 250 | 100 | 95 | 50 | 100 | 250 | 35 | 30 |
| layer | 2 | 3 | 4 | 5 | 6 | 8 | 7 | 7 |

|  | $ZSO_5$ | TiZrOx | ZnO—Al | Ag | TiOx | $ZSO_9$ | $ZSO_5$ | TiZrOx |
|---|---|---|---|---|---|---|---|---|
| Ex. 1 | 180 | 100 | 80 | 120 | 50 | 80 | 235 | 100 |
| Ex. 2 | 180 | 100 | 80 | 120 | 50 | 80 | 235 | 50 |
| layer | 2 | 9 | 3 | 4 | 5 | 6 | 8 | 7 |

In these tables, the meanings of the abbreviations are:
ZSO5 is a mixed oxide of zinc and tin containing 50% by weight of each constituent;
ZSO9 denotes a layer of zinc oxide doped with 10% by weight of tin oxide;
TiOx is an under-oxidized titanium oxide;
TiZrOx is a mixed titanium oxide comprising, on a weight basis, 50% of $TiO_2$, 46% of $ZrO_2$, the remainder being formed from elements usually accompanying zirconium, especially the oxide $Y_2O_5$; this oxide may be stoichiometric or sub-stoichiometric;
ZnO—Al is an aluminium-doped zinc oxide with an aluminium content of 5%;
TiN is titanium nitride;
C is a layer of graphite obtained by formation from a graphite cathode under an inert atmosphere.

The structures according to the invention are distinguished from the examples of prior products by the nature of the surface layer. Titanium nitride layers are conventional. The graphite coating adds to the mechanical strength by avoiding contact with the underlying layers via a kind of "lubrication". According to the invention, these layers are replaced with titanium oxide comprising a large proportion of zirconium oxide.

The scratch resistance tests, performed according to standard ASTM 2486D, lead to the following results.

The proportion of scratches for the comparative examples 1 and 2 is, respectively, 40% and 10%. For Example 2, the presence of the layer of carbon substantially improves the result, but complicates the production. In addition, it must mandatorily be "burnt" during the heat treatment to which the glazing is subjected so as not to impair the light transmission.

The structures according to the invention have, respectively, for Examples 1 and 2, a proportion of scratches of 10% and 5%. In other words, the products are at least as resistant as the best prior products and, what is more, offer good light transmission.

Other tests are performed with surface layers based on a mixed oxide of titanium and silicon (TiOx—Si). The content of silicon oxide is 8% by weight. The deposition of these layers is performed either in a neutral gas (Ar) or in a mixture of neutral gas and of oxygen comprising 7% oxygen. These structures are again tested at different thicknesses for the surface layer (30, 80 and 130 Å).

The structure of the layer systems is analogous to that of the preceding Example 1.

| $TiO_2$ | $ZSO_9$ | Ag | TiOx | $ZSO_9$ | TiOx—Si |
|---|---|---|---|---|---|
| 180 | 60 | 120 | 20 | 210 | |

$TiO_2$ is deposited under conditions that lead to a virtually stoichiometric oxide.

The following combinations are prepared and the properties indicated for the dry-brush scratch resistance and the "Cleveland" chemical test.

All the "Cleveland" tests show very good resistance. The grades are all 4 or more on the scale from 1 to 5. The brush resistance gives the following results as a percentage of scratches:

|  | $O_2$% | Thickness Å | Resistance |
|---|---|---|---|
| TiOx-Si (8% Si) | 0 | 30 | |
|  |  | 80 | 90 |
|  |  | 130 | 90 |
|  | 7 | 30 | 30 |
|  |  | 80 | 20 |
|  |  | 130 | 10 |

The abrasion resistance values show a manifest progression for the layers deposited under an atmosphere containing oxygen. This improvement is particularly noticeable in the case of the mixed silicon oxide. This scratch resistance also depends, to a lesser extent, on the thickness of the layer. On the whole, the mixed oxide with aluminium is mechanically stronger.

The use of carbon layers for their anti-abrasive qualities as a protection for layer systems is known. The use of these carbon layers is particularly directed towards protection during the production, transportation and storage processes. The presence of these layers, even those of low thickness, normally gives rise to an impairment in light transmission. The thickness of these layers ordinarily does not exceed 15 nm and preferably not 10 nm. For this reason, these layers are generally used temporarily. They are removed to re-establish the underlying layer system. Various methods may be used to remove the carbon layer. To obtain total removal, the most effective techniques correspond to removal by oxidation at high temperature. Since the layer systems according to the invention are designed to withstand high temperatures, they are particularly suited to additional protection by means of a carbon layer.

Samples are prepared that reproduce the structures of the comparative examples 1 and 2, with the exception of their layer 7. In the comparative examples, this layer is of TiN and of TiN coated with carbon. In the example according to the invention, the layer 7 is formed from titanium-zirconium mixed oxide and this same layer coated with carbon. The structures are (thicknesses again in Angströms):

|          | ZSO5 | ZSO9 | Ag | TiOx | ZSO9 | ZSO5 | TiN or TiZrOx | C  |
|----------|------|------|----|------|------|------|---------------|----|
| Comp. Ex. 1 | 250  | 100  | 95 | 50   | 100  | 250  | 35            |    |
| Comp. Ex. 2 | 250  | 100  | 95 | 50   | 100  | 250  | 35            | 30 |
| Ex. 3    | 250  | 100  | 95 | 50   | 100  | 250  | 35            |    |
| Ex. 4    | 250  | 100  | 95 | 50   | 100  | 250  | 35            | 30 |
| Layer    | 2    | 3    | 4  | 5    | 6    | 8    | 7             | 7  |

The scratch resistance tests are reported previously in the comparative examples (40% and 10%). For the two samples according to the invention, the proportions of scratches found are, respectively, about 10% and 5%. In the two series, the improvement afforded by the presence of the carbon layer is thus clearly observed. Similarly, for an identical structure, the presence of the surface layer based on titanium zirconium mixed oxide is more resistant.

The preceding samples were subjected to a series of resistance tests.

The first test concerns the resistance to condensation according to the Cleveland method that is the subject of standard ISO 6270. According to this test, the samples are maintained under an atmosphere saturated with moisture at a constant temperature for several days. The possible appearance of defects and their density are noted. The test is considered as successful when the level reached after 1 day is 4 on a scale ranging from 1 to 5, the note 5 corresponding to a defect-free sample.

A test is also performed in a climatic chamber. This is also a test of resistance to condensation. In this test, the temperature passes from 45 to 55° C. alternatively each time for 1 hour. The atmosphere is also saturated with moisture. As previously, the result is good when the level after 3 days is at least 3 on the scale from 1 to 5.

The saline spray test is performed according to standard EN1096. The sample in this case is satisfactory when the level is at least 2.5 after 2 days, still on the scale from 1 to 5.

The UV stability is determined by accelerated exposure. The level is satisfactory if it is at least 3.

The results obtained are reported in the following table:

|             | Cleveland 3 d. | Clim. ch. 3 d. | Sprays 2 d. | UV   |
|-------------|----------------|----------------|-------------|------|
| Comp. Ex. 1 | 3.5            | 3.5            | 3.75        | 3.5  |
| Example 3   | 4              | 4              | 4.25        | 4    |
| Comp. Ex. 2 | 3.5            | 3.5            | 2.75        | 4    |
| Example 4   | 4.25           | 4.25           | 4           | 4    |

Compared with the reference samples, the structures according to the invention behave at least as well, and are particularly resistant in the moisture resistance tests.

Another series of tests is performed with, under the protective layer based on titanium oxide, a layer of titanium or of titanium nitride. The structure of the layer system is as follows (thicknesses in Angströms):
glass/ZSO5(190)/TiZrOx(140)/ZSO9(50)/Ag(130)/Ti(50)/ZSO5(240)/top coat The "top coat" protective layer is formed according to the samples in the following manner:

| Comp. Ex. 3 | TiN | 32 |   |
| Comp. Ex. 4 | TiN | 32 | C |
| Ex. 5  | Ti  | 27 | TiZrOx | 30 |
| Ex. 6  | Ti  | 30 | TiZrOx | 30 |
| Ex. 7  | Ti  | 27 | TiZrO  | 30 |
| Ex. 8  | Ti  | 27 | TiZrO  | 30 |
| Ex. 9  | TiN | 24 | TiZrO  | 30 |
| Ex. 10 | TiN | 24 | TiZrOx | 30 |

The notations are the same as in the preceding examples. In these notations, Ti denotes a titanium layer deposited from a metal target under an atmosphere of neutral gas. Under these conditions, the constituted layer is essentially metallic. It is intended to become oxidized during the subsequent heat treatment to which the glazing is subjected. TiZrOx denotes a layer deposited from an under-oxidized ceramic target, under an atmosphere that is also free of oxygen. Under these conditions, the layer formed also remains slightly under-oxidized before the heat treatment. TiZrO denotes layers produced from the same type of targets but under an atmosphere composed of an argon-oxygen mixture containing 8% oxygen. Under these conditions, the layer formed is virtually stoichiometric.

The samples are subjected to a toughening operation after being maintained for 9 minutes at a temperature of 670° C. The two comparative samples have the appearance of an interfering veil. Samples 5 to 10 according to the invention are virtually free of substantial modification after this heat treatment.

The same samples are subjected to three resistance tests: the saline fog test (EN1096), the "wet rub test" and the scratch test (ASTM 2486D).

The "wet rub test" is intended to evaluate the resistance of the layer system to peeling by rubbing. The sample is subjected to rubbing with a piece of cotton fabric kept wet (demineralized water) under a load. The to-and-fro rubbing is performed at a frequency of 60 oscillations per minute. The movement is maintained usually for 500 cycles.

The change in the upper layer and the possible removal of this layer by this rubbing are observed.

Comparative sample 3 is not sufficiently resistant to mechanical wear in the two tests. Comparative sample 4 does not satisfy the saline fog test.

Samples 5 to 10 according to the invention are, themselves, satisfactory in these three tests.

The layers used according to the invention based on titanium oxide as protective surface layers also have the advantage, in addition to their mechanical strength, of being very transparent at visible wavelengths. This transparency is proportionately better the more complete the oxidation of the layer. FIGS. 3 and 4 illustrate this feature.

In these figures, a series of absorption measurements are reported as a function of the wavelength. The measurements are taken on monolayers of titanium zirconium mixed oxide of the same type as those forming the subject of the preceding examples. The layers are deposited on a clear glass pane 4 mm thick.

The TiZrOx layer is uniformly 16 nm. It is deposited under an argon atmosphere whose oxygen content is variable, at a constant total pressure of 0.8 Pa.

The depositions are performed using a ceramic target comprising the titanium zirconium oxide mixture. The oxygen flow rate is, successively, zero (diamond), then 1 (circle), 2.5 (triangle), 5 cm$^3$ (square) per kW of power applied at the cathode. The fifth measurement (star) corresponds to the final sample (5 cm$^3$) that has been subjected to the heat treatment at 600° C. for 3 minutes.

Under the atmosphere of argon alone, the absorption of the layer, FIG. 3, is very large. This absorption corresponds to the existence of sub-stoichiometry inherent to formation under this type of atmosphere. As soon as a small amount of oxygen is introduced, the ability of the titanium to react rapidly leads to radically different behaviour. The absorption is substantially reduced. The oxide mixture tends towards stoichiometry.

In FIG. 3, the various curves are very close together. To distinguish the effects of the oxygen content, the results are reported on another scale in FIG. 4. It is found in this figure that the absorption is lower overall when the oxygen content is increased. However, a limit is rapidly reached. The curve that is shown for the sample that has undergone a heat treatment is virtually identical to that for the sample before this treatment. The layer is thus virtually stoichiometric for these concentrations.

Besides the structures given in the preceding examples, advantageous structures comprising the surface layers according to the invention, i.e. the layers of mixed oxides of titanium and of hard oxide, and those on which is mounted an additional carbon layer, the assembly constituting a protective "top coat" layer, are especially:

glass/$TiO_2$/ZnO/Ag/NiCr/SiAlN/top coat
glass/ZSO5/$TiO_2$/ZnO/Ag/barrier/SiAlON/top coat
glass/SiAlN/NiCr/Ag/NiCr/SiAlN/top coat
glass/SiAlN/ZnO/Ag/NiCr/SiAlN/top coat
glass/SiAlN/ZnO/Ag/NiCr/ZnO/SiAlN/ZnO/Ag/NiCr/top coat
glass/$TiO_2$/ZnO/Ag/NiCr/$SnO_2$/ZnO/Ag/NiCr/$SnO_2$/top coat
glass/ZSO5/ZSO9/Ag/barrier/ZSO5/ZSO9/Ag/barrier/ZSO5/SiAlON/top coat.

In these structures, besides the "top coat" layer, the other layers are used under the usual working conditions and to make them perform their conventional function:
NiCr as sacrificial layer;
SiAlON as indicator and protective layer;
$TiO_2$ and $SnO_2$ as indicator layer;
ZnO as indicator layer, but also promoting the growth of the silver layer when in contact therewith and of relatively low thickness (less than 10 nm).

The invention claimed is:

1. An essentially transparent glazing comprising a system of films deposited under vacuum by magnetron and having antisun properties, low-emission properties, or both properties, the system of films comprising:
a silver-comprising functional layer,
a sacrificial layer coating the silver-comprising functional layer, the sacrificial layer comprising an oxide or suboxide of Ti, Zr, Nb, or NiCr, and
a top coat comprising a first protective layer,
wherein the first protective layer consists essentially of titanium oxide and at least one other metal oxide of high hardness selected from the group consisting of $ZrO_2$ and $Cr_2O_3$, and
wherein the glazing is toughened.

2. The glazing according to claim 1, wherein the at least one other metal oxide, besides the titanium oxide, of the first protective layer is at least 5% by weight of the first protective layer.

3. The glazing according to claim 1, wherein the titanium oxide is at least 40% by weight of the first protective layer.

4. The glazing according to claim 1, wherein a content of zirconium oxide in the first protective layer is from 15% to 50% by weight.

5. The glazing according to claim 1, wherein the first protective layer has a thickness not less than 3 nm.

6. The glazing according to claim 1, wherein the first protective layer has a thickness not greater than 35 nm.

7. The glazing according to claim 1, wherein the top coat further comprises a second protective layer, directly underneath the first protective layer, comprising metallic titanium, titanium nitride, Zr, Zr nitride, TiZr, or TiZr nitride.

8. The glazing according to claim 1, wherein the top coat further comprises a layer of carbon above the first protective layer.

9. The glazing according to claim 8, wherein the carbon layer has a thickness that is not greater than 30 nm.

10. The glazing according to claim 1, wherein the top coat is obtained by a process comprising:
temporarily applying a carbon layer above the first protective layer, and
removing the carbon layer by oxidation during a heat treatment under an oxidative atmosphere.

11. The glazing according to claim 1, which, in a scratch resistance test performed according to standard ASTM 2486D, leads to a proportion of scratches of not more than 30%.

12. The glazing according to claim 1, wherein the system of films further comprises:
a dielectric layer between a glass substrate and a first silver-comprising layer, and
a dielectric layer over a last silver-comprising layer that is furthest from the substrate,
wherein, if the system of films comprises more than one silver-comprising functional layer, the system of films further comprises a dielectric layer between each silver-comprising layer.

13. The glazing according to claim 12, comprising one, two, or three silver-comprising layers, each with a thickness of from 7 to 20 nm.

14. The glazing according to claim 1, wherein the system of films has a structure selected from the group consisting of:
glass/$TiO_2$/ZnO/Ag/NiCr/SiAlN/top coat,
glass/SiAlN/NiCr/Ag/NiCr/SiAlN/top coat,
glass/SiAlN/ZnO/Ag/NiCr/SiAlN/top coat,
glass/SiAlN/ZnO/Ag/NiCr/ZnO/SiAlN/ZnO/Ag/NiCr/top coat, and
glass/$TiO_2$/ZnO/Ag/NiCr/$SnO_2$/ZnO/Ag/NiCr/$SnO_2$/top coat,
wherein the following layers are formed conventionally and play a following role:
NiCr as sacrificial layer;
SiAlN as indicator and protective layer;
$TiO_2$ and $SnO_2$ as indicator layer; and
ZnO as indicator layer, but also promoting the growth of the silver layer when in contact therewith and of thickness less than 15 nm.

15. The glazing of claim 1, wherein the system of films further comprises:
a layer comprising zinc oxide optionally doped with tin, aluminum, or gallium,
wherein the silver-comprising layer is deposited on the layer comprising zinc oxide.

16. A process for preparing the glazing according to claim 1, the process comprising:
depositing the first protective layer by magnetron-assisted vacuum deposition, from cathodes comprising a corresponding mixture of oxides or of suboxides.

17. The process according to claim 16, wherein the depositing of the first protective layer is under a slightly oxidative atmosphere.

18. An essentially transparent glazing comprising a system of films deposited under vacuum by magnetron and having antisun properties, low-emission properties, or both properties, the system of films comprising:
- a layer comprising zinc oxide optionally doped with tin, aluminum, or gallium,
- a silver-comprising functional layer, deposited on the layer comprising zinc oxide, and
- a top coat comprising a first protective layer consisting essentially of titanium oxide and at least one other metal oxide of high hardness selected from the group consisting of $ZrO_2$ and $Cr_2O_3$.

19. The glazing according to claim 18, wherein the system of films further comprises:
- a dielectric layer between a glass substrate and a first silver-comprising layer, and
- a dielectric layer over a last silver-comprising layer that is furthest from the substrate,
- wherein, if the system of films comprises more than one silver-comprising functional layer, the system of films further comprises a dielectric layer between each silver-comprising layer.

20. The glazing of claim 18, wherein the top coat further comprises a layer of carbon above the first protective layer.

21. An essentially transparent glazing comprising a system of films deposited under vacuum by magnetron and having antisun properties, low-emission properties, or both properties, the system of films comprising:
- a silver-comprising functional layer,
- a sacrificial layer coating the silver-comprising functional layer, the sacrificial layer comprising an oxide or sub-oxide of Ti, Zr, Nb, or NiCr, and
- a top coat comprising a first protective layer,
- wherein the first protective layer consists of (i) titanium oxide; (ii) at least one other metal oxide of high hardness selected from the group consisting of $ZrO_2$ and $Cr_2O_3$; and (iii) optionally one or more additional oxides that are practically indissociable from the oxides of (i) and (ii), and
- wherein the glazing is toughened.

22. The glazing according to claim 21, wherein a content of (iii) does not exceed 8% by weight of the first protective layer.

* * * * *